US012633694B2

(12) United States Patent
Yamada et al.

(10) Patent No.: US 12,633,694 B2
(45) Date of Patent: May 19, 2026

(54) TERMINAL UNIT, FEMALE TERMINAL AND MALE TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yusuke Yamada, Mie (JP); Katsuhiko Aizawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 286 days.

(21) Appl. No.: 18/280,439

(22) PCT Filed: Mar. 1, 2022

(86) PCT No.: PCT/JP2022/008519

§ 371 (c)(1),
(2) Date: Sep. 5, 2023

(87) PCT Pub. No.: WO2022/190950

PCT Pub. Date: Sep. 15, 2022

(65) Prior Publication Data

US 2024/0154335 A1 May 9, 2024

(30) Foreign Application Priority Data

Mar. 8, 2021 (JP) ................................ 2021-036558

(51) Int. Cl.
*H01R 13/11* (2006.01)
*H01R 13/04* (2006.01)

(52) U.S. Cl.
CPC ............. *H01R 13/11* (2013.01); *H01R 13/04* (2013.01)

(58) Field of Classification Search
CPC ........ H01R 13/11; H01R 13/04; H01R 13/113
(Continued)

(56) References Cited

U.S. PATENT DOCUMENTS 4,721,484 A 1/1988 Sakamoto et al.
2001/0051472 A1 12/2001 Sato et al.
(Continued)

FOREIGN PATENT DOCUMENTS

JP S52-029271 Y1 7/1977
JP 2011-100685 A 5/2011
JP 2019-061743 A 4/2019

OTHER PUBLICATIONS

Machine Translation of JP2019061743 (Year: 2019).*
International Search Report issued on Apr. 12, 2022 for WO 2022/190950 A1 (6 pages).

*Primary Examiner* — Tulsidas C Patel
*Assistant Examiner* — Jeffrey Mountain
(74) *Attorney, Agent, or Firm* — Venjuris, P.C.

(57) ABSTRACT

A terminal unit is provided with a male terminal and a female terminal. The female terminal includes a first wall portion and a second wall portion. The first wall portion includes a first resilient contact portion and a first contact point portion provided on the first resilient contact portion and to be brought into contact with a surface on one side of the male terminal. The first resilient contact portion biases the male terminal toward the second wall portion. The second wall portion includes a plurality of second resilient contact portions and a plurality of second contact point
(Continued)

portions provided on the plurality of second resilient contact portions and to be brought into contact with a surface on the other side of the male terminal. The respective second resilient contact portions bias the male terminal toward the first wall portion.

17 Claims, 5 Drawing Sheets

(58) Field of Classification Search
USPC .......................................................... 439/816
See application file for complete search history.

(56) References Cited

U.S. PATENT DOCUMENTS

| | | | | |
|---|---|---|---|---|
| 2010/0029146 | A1 | 2/2010 | Myer et al. | |
| 2010/0197177 | A1 | 8/2010 | Myer et al. | |
| 2010/0203756 | A1* | 8/2010 | Omori | H01R 31/08 439/507 |
| 2015/0133004 | A1* | 5/2015 | Uno | H01R 11/01 439/867 |
| 2020/0016787 | A1 | 1/2020 | Schweizer et al. | |
| 2023/0420877 | A1* | 12/2023 | Nishijima | H01R 13/113 |
| 2025/0030188 | A1* | 1/2025 | Tsukamoto | H01R 4/48 |

* cited by examiner

TERMINAL UNIT, FEMALE TERMINAL AND MALE TERMINAL

CROSS REFERENCE TO RELATED APPLICATIONS

This application is a national phase of PCT application No. PCT/JP2022/008519, filed on 1 Mar. 2022, which claims priority from Japanese patent application No. 2021-036558, filed on 8 Mar. 2021, all of which are incorporated herein by reference.

TECHNICAL FIELD

The present disclosure relates to a terminal unit and a female terminal and a male terminal used for this terminal unit.

BACKGROUND

Patent Document 1 discloses a terminal unit composed of a male terminal having a plate-like shape expressed as a tab-like shape and a female terminal to be connected to the male terminal. The female terminal includes a pair of wall portions arranged to face each other across a male terminal insertion gap, one wall portion is provided with a resilient contact piece for pressing the male terminal against the other wall portion and a plurality of contact points are provided to project on the other wall portion.

PRIOR ART DOCUMENT

Patent Document

Patent Document 1: JP 2002-063961 A

SUMMARY OF THE INVENTION

Problems to be Solved

In the terminal unit of Patent Document 1, the plate-like male terminal sandwiched between the pair of wall portions of the female terminal is pressed against the contact points provided on the other wall portion by the resilient contact piece provided on the one wall portion. Thus, a front part and a rear part in an inserting direction of the male terminal inserted into the male terminal insertion gap may be displaced in vertically opposite directions with a pressing point by the resilient contact piece as a center of rotation due to the vibration of a vehicle or the like. In this case, troubles such as the separation of the male terminal from the contact points provided on the other wall portion and the plating wear of the terminal surfaces by being strongly pressed might occur.

Accordingly, a terminal unit capable of suppressing the separation of a male terminal from contact points of a female terminal and plating wear at the time of connecting the male and female terminals, and the female terminal and the male terminal used for the terminal unit are disclosed.

Means to Solve the Problem

A terminal unit of the present disclosure is provided with a plate-like male terminal and a female terminal to be connected to the male terminal, the female terminal including a first wall portion and a second wall portion arranged to face each other across a male terminal insertion gap, the male terminal being inserted into and arranged in the male terminal insertion gap, the first wall portion including a first resilient contact portion facing a surface on one side in a plate thickness direction of the male terminal, projecting toward the second wall portion and resiliently deformable in a direction separating from the second wall portion and a first contact point portion provided on the first resilient contact portion and to be brought into contact with the surface on the one side of the male terminal, the first resilient contact portion biasing the male terminal toward the second wall portion, the second wall portion including a plurality of second resilient contact portions facing a surface on the other side in the plate thickness direction of the male terminal, projecting toward the first wall portion and resiliently deformable in a direction separating from the first wall portion and a plurality of second contact point portions respectively provided on the plurality of second resilient contact portions and to be brought into contact with the surface on the other side of the male terminal, the respective second resilient contact portions biasing the male terminal toward the first wall portion, and the plurality of second contact point portions being arranged at a plurality of positions separated on both sides of the first contact point portion in an inserting direction of the male terminal into the male terminal insertion gap.

A female terminal of the present disclosure is the female terminal used in the terminal unit of the present disclosure.

A male terminal of the present disclosure is the male terminal used in the terminal unit of the present disclosure.

Effect of the Invention

According to the present disclosure, it is possible to provide a terminal unit capable of suppressing the separation of a male terminal from contact points of a female terminal and plating wear at the time of connecting the male and female terminals and the female terminal and the male terminal used for the terminal unit.

DETAILED DESCRIPTION TO EXECUTE THE INVENTION

Description of Embodiments of Present Disclosure

Figure 1:
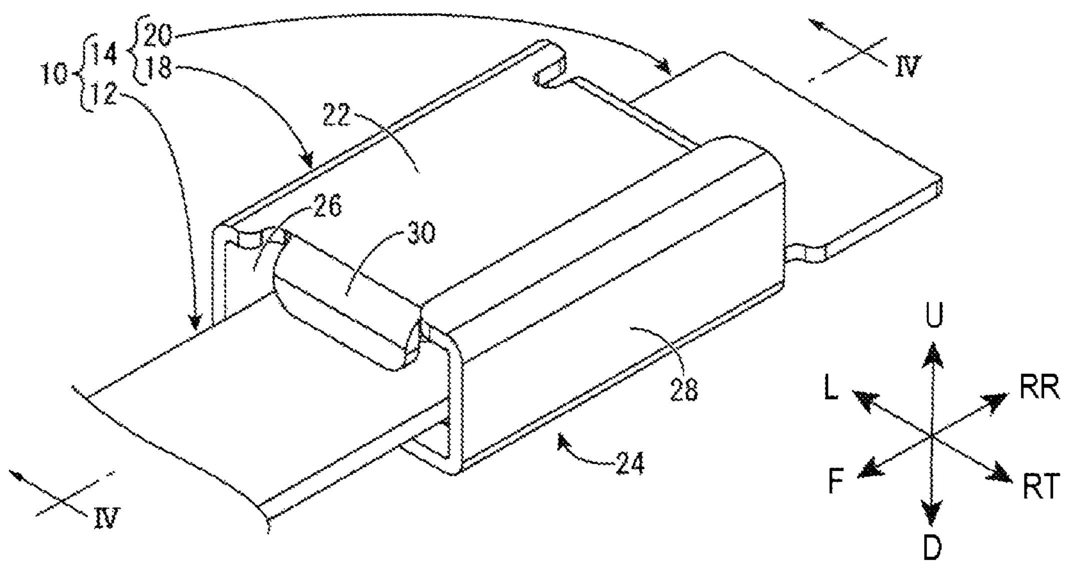
FIG. 1 is an overall perspective view showing a terminal unit according to a first embodiment.

First, embodiments of the present disclosure are listed and described.

(1) The terminal unit of the present disclosure is provided with a plate-like male terminal and a female terminal to be connected to the male terminal, the female terminal including a first wall portion and a second wall portion arranged to face each other across a male terminal insertion gap, the male terminal being inserted into and arranged in the male terminal insertion gap, the first wall portion including a first resilient contact portion facing a surface on one side in a plate thickness direction of the male terminal, projecting toward the second wall portion and resiliently deformable in a direction separating from the second wall portion and a first contact point portion provided on the first resilient contact portion and to be brought into contact with the surface on the one side of the male terminal, the first resilient contact portion biasing the male terminal toward the second wall portion, the second wall portion including a plurality of second resilient contact portions facing a surface on the other side in the plate thickness direction of the male terminal, projecting toward the first wall portion and resiliently deformable in a direction separating from the first wall portion and a plurality of second contact point portions respectively provided on the plurality of second resilient contact portions and to be brought into contact with the surface on the other side of the male terminal, the respective second resilient contact portions biasing the male terminal toward the first wall portion, and the plurality of second contact point portions being arranged at a plurality of positions separated on both sides of the first contact point portion in an inserting direction of the male terminal into the male terminal insertion gap.

According to the terminal unit of the present disclosure, the first and second contact point portions of the female terminal to be brought into contact with the both sides in the plate thickness direction of the male terminal are respectively provided on the first and second resilient contact portions for biasing the male terminal from the both sides in the plate thickness direction. Thus, even if the male terminal is displaced with respect to the female terminal due to the vibration of a vehicle or the like at the time of connecting the male and female terminals, the first and second resilient contact portions can follow the displacement of the male terminal by being resiliently deformed. As a result, the first and second contact point portions provided on the first and second resilient contact portions can be held in contact with the male terminal. In addition, the plurality of second contact point portions are arranged at the plurality of positions separated on the both sides of the first contact point portion in the inserting direction of the male terminal into the male terminal insertion gap. In this way, displacements of the male terminal in vertically opposite directions on both sides in the inserting direction with the first contact point portion as a center of rotation can be both stably absorbed by the resilient deformation of the second resilient contact portions and the followability of the plurality of second contact point portions to the male terminal can be improved. As a result, it is also possible to suppress the separation of the male terminal from the second contact point portions and the plating wear of the surfaces of the male and female terminals caused by the male terminal being strongly pressed against the second contact point portions more than necessary. That is, the terminal unit of the present disclosure can suppress the separation of the male terminal from the contact point portions and the plating wear at the time of connecting the male and female terminals.

(2) Preferably, the male terminal includes a pair of inclined portions inclined toward the one side in the plate thickness direction of the male terminal on both sides in a first direction intersecting the inserting direction, and the plurality of second contact point portions provided on the plurality of second resilient contact portions contact the respective inclined portions at a plurality of positions separated on the both sides of the first contact point portion in the inserting direction. The male terminal includes the pair of inclined portions inclined toward the one side in the plate thickness direction of the male terminal on the both sides in the plate width direction of the male terminal, and the plurality of second contact point portions provided on the plurality of second resilient contact portions of the female terminal contact the respective inclined portions. In this way, even if the male terminal is displaced in vertically opposite directions on the both sides in the inserting direction with the first contact point portion of the female terminal as a center of rotation, a contact state of the second contact point portions of the female terminal with the respective inclined portions of the male terminal can be suitably maintained. Therefore, it is possible to suppress troubles such as the separation of the male terminal from the second contact point portions of the female terminal and the plating wear. Moreover, if the male terminal inserted into the male terminal insertion gap is pressed toward the second wall portion by the first resilient contact portion of the female terminal, the inclined portions of the male terminal are pressed against the second contact point portions of the female terminal on the both sides in the plate width direction of the male terminal and component forces (reaction forces from the second contact point portions) acting inward in the plate width direction are generated. As a result, forces for hindering displacements of the male terminal against an external force acting in the plate width direction of the male terminal can be increased, and a displacement of the male terminal in the plate width direction with respect to the female terminal can also be suppressed. Fine sliding friction between the male and female terminals due to vibration or the like and an increase of a contact resistance value associated therewith can also be suppressed.

(3) Preferably, the second wall portion of the female terminal includes a pair of side edge parts respectively facing the pair of inclined portions of the male terminal and an intermediate part located between the pair of side edge parts in the first direction, each side edge part includes a window portion penetrating in the plate thickness direction and two second resilient contact portions in the form of leaf springs having base end parts coupled to an end surface of the intermediate part facing the window portion and cantilevered toward the window portion, and the two second resilient contact portions of each side edge part are respectively arranged at two positions separated on the both sides of the first contact point portion in the inserting direction, each second resilient contact portion is so inclined that a tip side is closer to the first wall portion than the base end part, and the second contact point portion is provided on the tip side of each second resilient contact portion. The second resilient contact portions in the form of leaf springs cantilevered from the intermediate part can be easily provided by press punching or the like in the pair of side edge parts of the female terminal facing the pair of inclined portions of the male terminal. Moreover, in each side edge part facing each inclined portion, the second resilient contact portions are respectively arranged at two positions separated on the both sides of the first contact point portion in the inserting direction of the male terminal. The second contact point portion is provided on the tip side of each second resilient contact portion. Therefore, displacements of the male terminal in vertically opposite directions on the both sides in the inserting direction with the first contact point portion as a center of rotation can be both stably absorbed by the resilient deformation of the second resilient contact portions and it is possible to suppress troubles such as the separation of the inclined portions of the male terminal from the second contact point portions and the plating wear.

In addition, each second resilient contact portion is so inclined that the tip side is closer to the first wall portion than the base end part. In this way, reaction forces generated in directions perpendicular to the second contact point portions, which are reaction forces from the second contact point portions respectively in contact with the pair of inclined portions of the male terminal, can also be caused to act inward in the plate width direction of the male terminal on the both sides in the plate width direction of the male terminal. In this way, forces for hindering displacements of the male terminal against an external force acting in the plate width direction of the male terminal can be increased by more advantageously utilizing the reaction forces from the second contact point portions. Therefore, an effect of suppressing a displacement of the male terminal in the plate width direction with respect to the female terminal can also be improved.

(4) Preferably, the male terminal includes a flat portion arranged between the pair of inclined portions in the plate width direction, and the first contact point portion of the first resilient contact portion of the female terminal contacts the flat portion of the male terminal. The first contact point portion of the female terminal is pressed against the flat portion of the male terminal from the one side in the plate thickness direction of the male terminal, and the second contact point portions of the female terminal are pressed against the pair of inclined portions of the male terminal at the plurality of positions separated from the first contact point portion in the inserting direction of the male terminal from the other side in the plate thickness direction of the male terminal. In this way, the male terminal can be stably held by at least five contact point portions of the female terminal and contact resistance can be reduced.

(5) The female terminal of the present disclosure is the female terminal used in the terminal unit of any one of (1) to (4) described above. Since being used in the terminal unit of any one of (1) to (4) described above, the female terminal can similarly have functions and effects enjoyable by the terminal units of (1) to (4) described above. Therefore, it is possible to suppress the separation of the male terminal from the contact point portions of the female terminal and the plating wear at the time of connecting the male and female terminals.

(6) The male terminal of the present disclosure is the male terminal used in the terminal unit of any one of (2) to (4) described above. Since being used in the terminal unit of any one of (2) to (4) described above, the male terminal of the present disclosure can similarly have functions and effects enjoyable by the terminal units of (2) to (4) described above. Therefore, it is possible to suppress the separation of the male terminal from the contact point portions of the female terminal and the plating wear at the time of connecting the male and female terminals.

Details of Embodiment of Present Disclosure

Specific examples of a terminal unit of the present disclosure and a female terminal and a male terminal used for the terminal unit are described below with reference to the drawings. Note that the present disclosure is not limited to these illustrations, but is represented by claims and intended to include all changes in the scope of claims and in the meaning and scope of equivalents.

First Embodiment

Hereinafter, a terminal unit 10 of a first embodiment of the present disclosure is described below using FIGS. 1 to 4. The terminal unit 10 is provided with a male terminal 12 and a female terminal 14. The male terminal 12 and the female terminal 14 are electrically connected by inserting the male terminal 12 into the female terminal 14 and bringing these terminals into contact. Note that although the terminal unit 10 can be arranged in an arbitrary orientation, a vertical direction, a lateral direction and a front-rear direction are based on a vertical direction, a lateral direction and a front-rear direction shown in figures in the following description. Further, for a plurality of identical members, only some members may be denoted by a reference sign and the other members may not be denoted by the reference sign.

<Male Terminal 12>

The male terminal 12 has a plate-like shape as a whole, and is formed using an unillustrated flat plate fitting. The flat plate fitting has a rectangular shape, has predetermined plate width (lateral dimension in FIG. 2) and plate thickness (vertical dimension in FIG. 4) and extends straight. The male terminal 12 is electrically conductive and, for example, formed of metal having a low electrical resistance such as copper, copper alloy, aluminum or aluminum alloy.

As described later, with the male terminal 12 inserted in a male terminal insertion gap 16 of the female terminal 14, a surface on one side in a plate thickness direction (upper surface) of the male terminal 12 is arranged to face a first wall portion 22 of the female terminal 14. Further, a surface on the other side in the plate thickness direction (lower surface) is arranged to face a second wall portion 24 of the female terminal 14.

In the male terminal 12, an unillustrated flat plate portion extending straight is provided on a base end side in an inserting direction into the male terminal insertion gap 16 of the female terminal 14. The flat plate portion is, for example, provided with a bolt insertion hole, and is fixed to a terminal portion of a device or a wire.

<Female Terminal 14>

Figure 4:
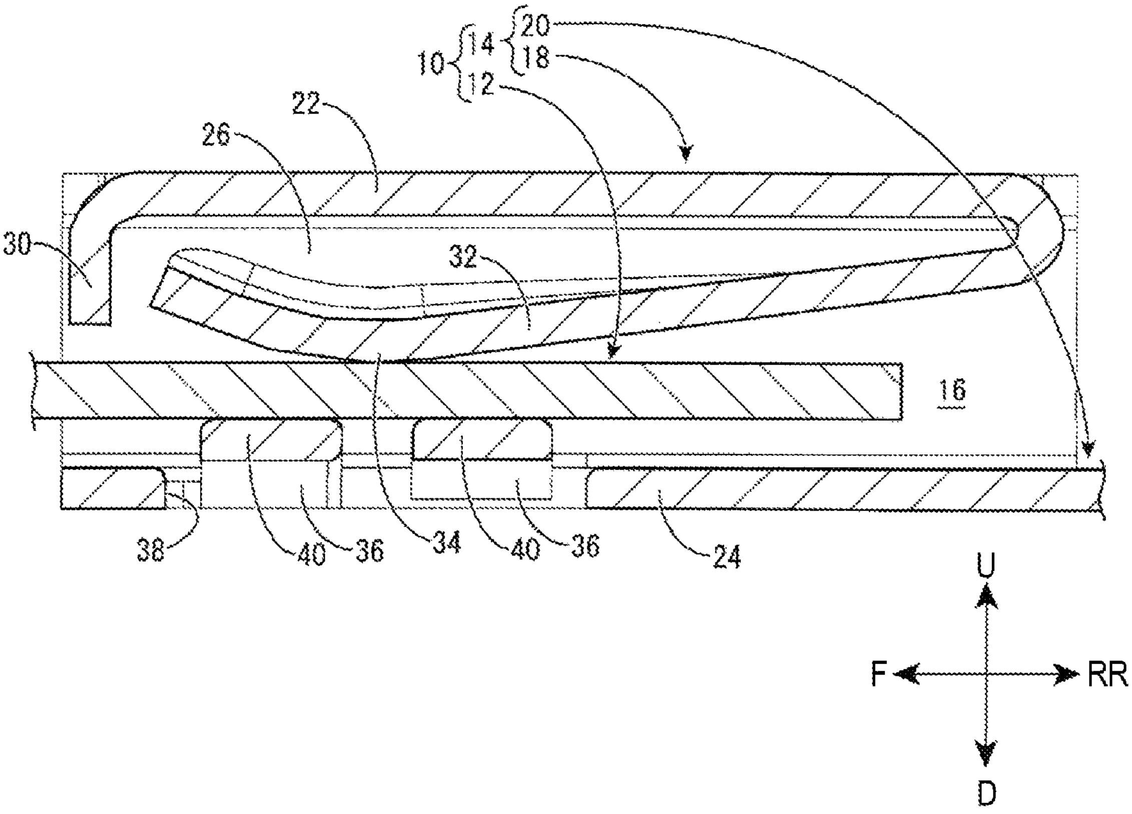
FIG. 4 is an enlarged section along IV-IV in FIG. 1.
Figure 5:
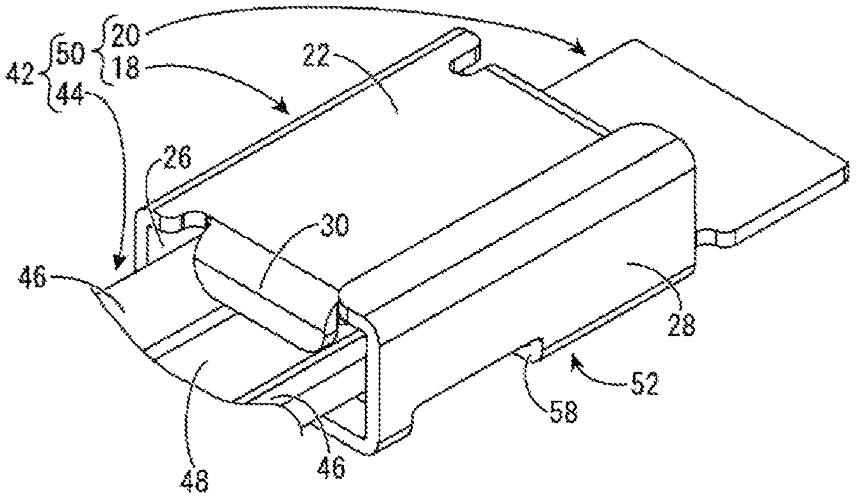
FIG. 5 is an overall perspective view showing a terminal unit according to a second embodiment.

For example, as shown in FIG. 4, the female terminal 14 is integrally configured to include a box-shaped body portion 18 having the male terminal insertion gap 16 open in the front-rear direction inside and a wire connecting portion 20 to be fixed to a core wire of an unillustrated wire. More particularly, the female terminal 14 is electrically conductive and formed using one of various materials such as brass, copper, copper alloy, aluminum and aluminum alloy, which can be press-worked or punched.

<Body Portion 18>

The body portion 18 is substantially in the form of a box and includes the first and second wall portions 22, 24 facing each other in the vertical direction and a pair of side walls 26, 28 facing each other in the lateral direction. In addition, the body portion 18 includes a protection wall 30 for covering a projecting tip part of a first resilient contact portion 32 to be described later from front.

The first resilient contact portion 32 in the form of a tongue piece is provided to extend on the rear end of the first wall portion 22 located on an upper side, and formed by being folded inwardly of the body portion 18 from the rear end of the first wall portion 22 as shown in FIG. 4. A tip part of the first resilient contact portion 32 is bent upward after the first resilient contact portion 32 extends straight in an oblique direction toward a front side and an axial center from the rear end of the first wall portion 22. As a result, the first resilient contact portion 32 includes a first contact point portion 34 to be brought into contact with the surface on the one side in the plate thickness direction (upper surface) of the male terminal 12 (see FIG. 4). The tip part of the male terminal 12 is insertable into a gap between the first resilient contact portion 32 and the second wall portion 24. That is, the first resilient contact portion 32 is cantilevered with a rear end side held on the first wall portion 22, and projects while gradually approaching the second wall portion 24 as extending forward. By inserting the male terminal 12 between the first resilient contact portion 32 and the second wall portion 24, the first resilient contact portion 32 is resiliently deformable in a direction separating from the second wall portion 24. As a result, the first resilient contact portion 32 biases the male terminal 12 toward the second wall portion 24.

The protection wall 30 in the form of a rectangular flat plate projecting toward the second wall portion 24 while having a width smaller than a separation distance between the pair of side walls 26 and 28 is provided on the front end of the first wall portion 22 located on the upper side. The tip part of the male terminal 12 is insertable through a gap between a projecting tip part of the protection wall 30 and the second wall portion 24. As shown in FIG. 4, the protection wall 30 is configured to cover the projecting tip part of the first resilient contact portion 32 from front. In this way, the first resilient contact portion 32 is protected from abnormal deformation caused by the contact of the tip part of the male terminal 12 with the projecting tip part of the first resilient contact portion 32.

Two second resilient contact portions 36 are provided to project toward the first wall portion 22 on a front side of the second wall portion 24 located on a lower side. Each of the two second resilient contact portions 36 is shaped such that a tip part is bent downward after the second resilient contact portion 36 projects toward the first wall portion 22 (see FIGS. 2 and 3). More particularly, a window portion 38 penetrating in the plate thickness direction is provided on the front side of the second wall portion 24, and the leaf spring-like second resilient contact portions 36 are cantilevered toward the window portion 38 with base end parts thereof coupled to peripheral edge parts of the window portion 38 on the sides of the side walls 26, 28. As a result, each of the two second resilient contact portions 36 includes a second contact point portion 40 to be brought into contact with the surface on the other side in the plate thickness direction (lower surface) of the male terminal 12 (see FIG. 4). By inserting the tip part of the male terminal 12 into a gap between the two second resilient contact portions 36 and one first resilient contact portion 32, both of the two second resilient contact portions 36 are resiliently deformable in a direction separating from the first wall portion 22. As a result, both of the two second resilient contact portions 36 bias the male terminal 12 toward the first wall portion 22. Further, the two second contact point portions 40 are arranged at two positions separated on both sides of the first contact point portion 34 in the inserting direction of the male terminal 12 into the male terminal insertion gap 16 (see FIG. 4).

The female terminal 14 having such a structure can be manufactured by the following method. For example, a metal flat plate is bent after being pressed and punched, whereby the first resilient contact portion 32, the second resilient contact portions 36 and the protection wall 30 are formed. Subsequently, the both side walls 26, 28 are bent from the second wall portion 24 serving as a bottom plate to face each other, and further the first wall portion 22 serving as a ceiling plate continuous from the side wall 26 is bent to face the second wall portion 24, whereby the box-shaped body portion 18 open on both front and rear sides is assembled.

An unillustrated engaging hole is provided to penetrate through a side edge part of the side wall 28, and an unillustrated locking portion to be fit into the engaging hole is provided to project on a side edge part of the first wall portion 22. After the locking portion is fit into the engaging hole, the side edge part of the side wall 28 is bent until coming into contact with the first wall portion 22, whereby the side wall 28 and the first wall portion 22 are engaged and fixed. In this state, the first resilient contact portion 32 and the two second resilient contact portions 36 are arranged in the body portion 18. Finally, the core wire of the unillustrated wire is fixed to the wire connecting portion 20.

According to the terminal unit 10 of the present disclosure structured as just described, the first contact point portion 34 and the second contact point portions 40 of the female terminal 14 respectively contact the surface on the one side (upper surface) and the surface on the other side (lower surface) in the plate thickness direction of the male terminal 12. The first contact point portion 34 and the second contact point portions 40 of the female terminal 14 are respectively provided on the first resilient contact portion 32 for biasing the male terminal 12 from the surface on the one side in the plate thickness direction (upper surface) and the second resilient contact portions 36 for biasing the male terminal 12 from the surface on the other side (lower surface). Thus, even if the male terminal 12 is displaced with respect to the female terminal 14 due to the vibration of a vehicle or the like with the female terminal 14 and the male terminal 12 connected, the first resilient contact portion 32 and the second resilient contact portions 36 can follow a displacement of the male terminal 12 by being resiliently deformed. That is, the first contact point portion 34 and the second contact point portions 40 provided on the first resilient contact portion 32 and the second resilient contact portions 36 can be held in contact with the male terminal 12. Moreover, the two second contact point portions 40 are arranged at two positions separated on the both sides of the first contact point portion 34 in the inserting direction (front-rear direction) of the male terminal 12 into the male terminal insertion gap 16 (see FIG. 4). In this way, even if the male terminal 12 is displaced in vertically opposite directions on both sides in the inserting direction with the first contact point portion 34 as a center of rotation, displacements can be stably absorbed by the resilient deformation of the two second resilient contact portions 36. Therefore, followability to the male terminal 12 can be improved. As a result of the above, it is also possible to suppress the separation of the male terminal 12 from the second contact point portions 40 and the plating wear of the surfaces of the female terminal 14 and the male terminal 12 caused by the male terminal 12 being strongly pressed against the second contact point portions 40 more than necessary. That is, according to the terminal unit 10 of the present disclosure, it is possible to suppress the separation of the male terminal 12 from the first contact point portion 34 and the second contact point portions 40, which are contact points of the female terminal 14, and the plating wear at the time of connecting the female terminal 14 and the male terminal 12.

The female terminal 14 of the present disclosure structured as just described similarly have functions and effects enjoyable by the aforementioned terminal unit 10. Therefore, it is possible to suppress the separation of the male terminal 12 from the first contact point portion 34 and the second contact point portions 40, which are contact points of the female terminal 14, and the plating wear at the time of connecting the female terminal 14 and the male terminal 12.

Second Embodiment

FIGS. 5 to 9 show a terminal unit 42 of a second embodiment of the present disclosure. In the following description, substantially the same members and parts as those of the first embodiment are denoted by the same reference signs in figures and not described.

Figure 2:
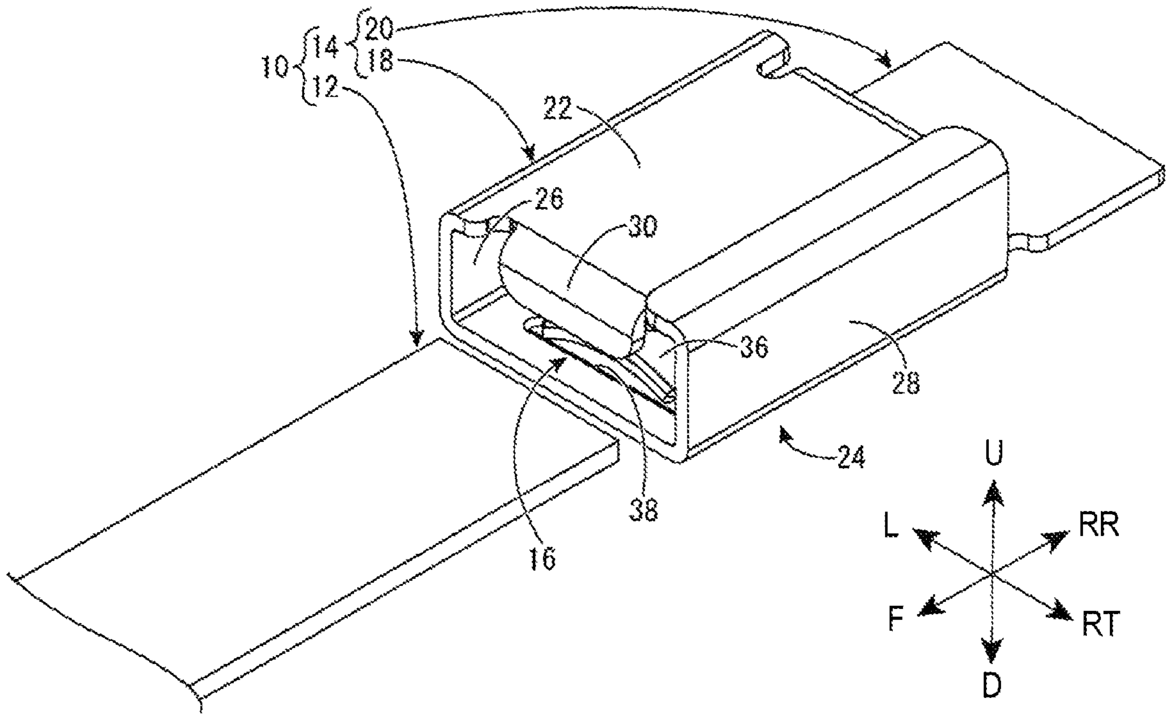
FIG. 2 is an exploded perspective view of FIG. 1.
Figure 3:
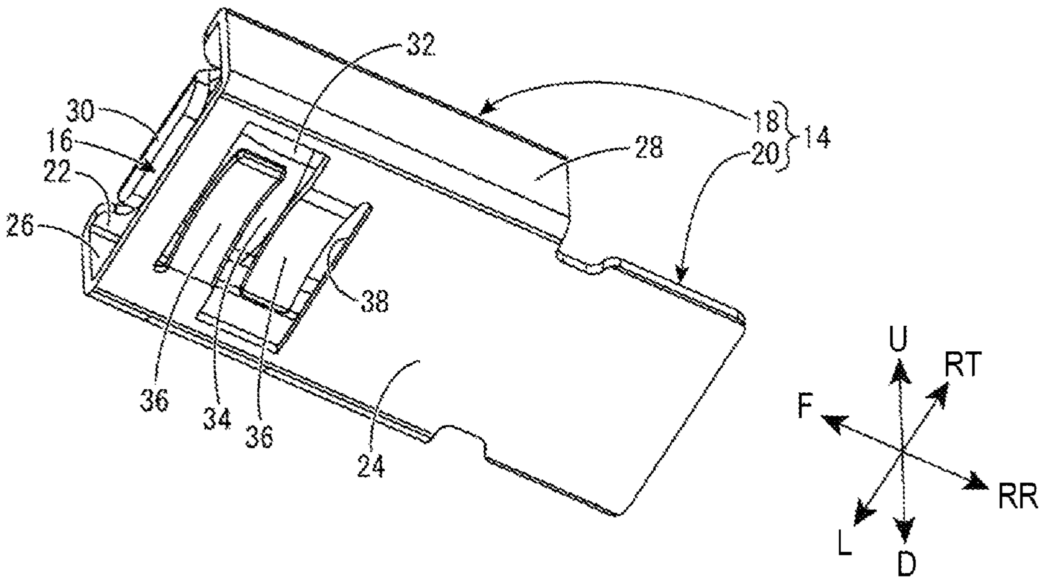
FIG. 3 is a perspective view of a female terminal shown in FIG. 2 when viewed from another direction.
Figure 6:
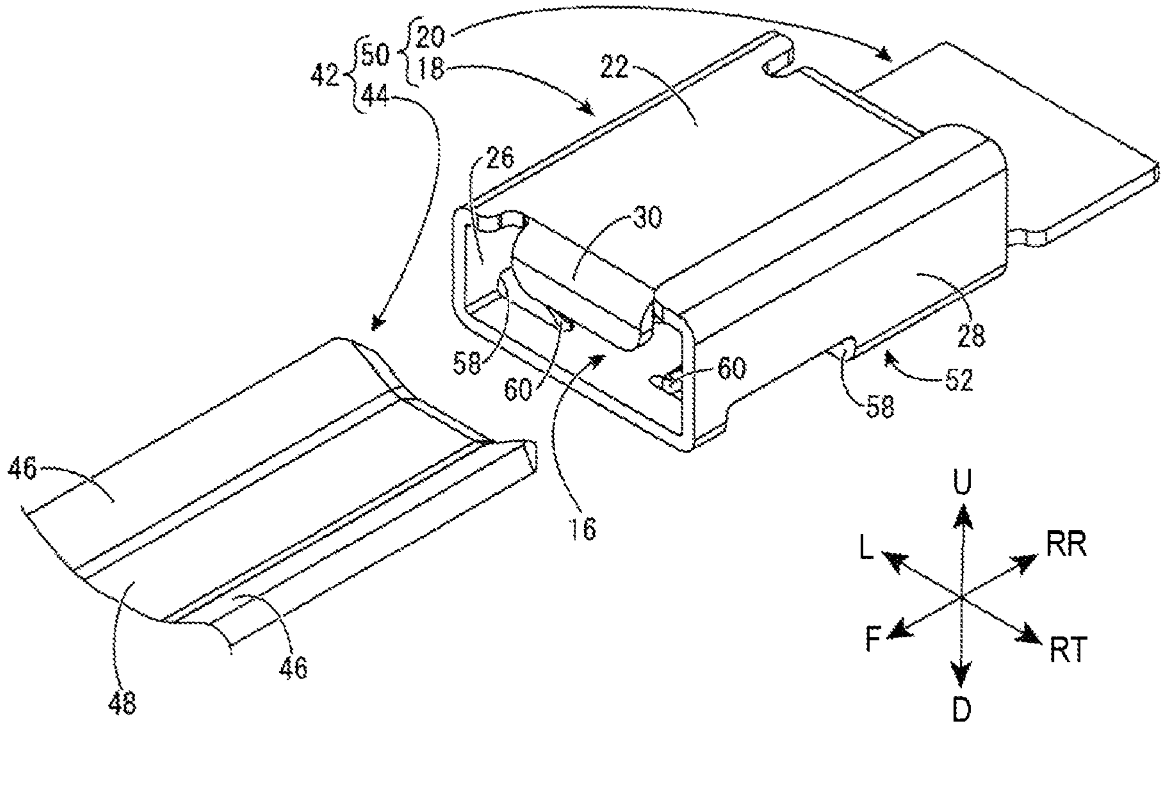
FIG. 6 is an exploded perspective view of FIG. 5.

Although the male terminal 12 has a flat plate shape as shown in FIG. 2 in the first embodiment, there is no limitation to this. For example, the terminal unit 42 of the second embodiment shown in FIG. 6 is the same as in the first embodiment in that a male terminal 44 has a plate-like shape as a whole, but differs from the first embodiment in that both end parts in a plate width direction are bent and inclined toward one side (upper side) in a plate thickness direction. In this way, a pair of inclined portions 46, 46 are formed on both sides in the plate width direction of the male terminal 44, which is a first direction intersecting an inserting direction of the male terminal 44. A flat portion 48 extending flat is provided in a central part in the plate width direction of the male terminal 44, i.e. between the pair of inclined portions 46, 46 in the plate width direction. A first contact point portion 34 of a first resilient contact portion 32 of a female terminal 50 contacts the flat portion 48 of the male terminal 44 (see FIG. 7).

Figure 7:
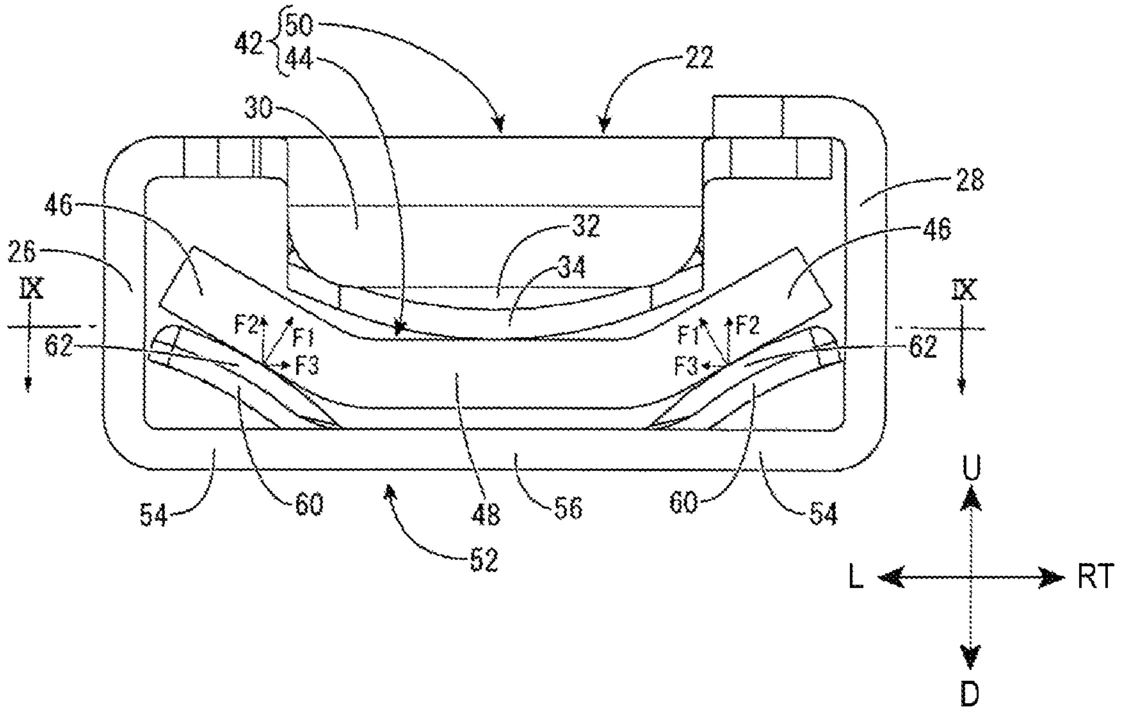
FIG. 7 is an enlarged front view of FIG. 5.
Figure 8:
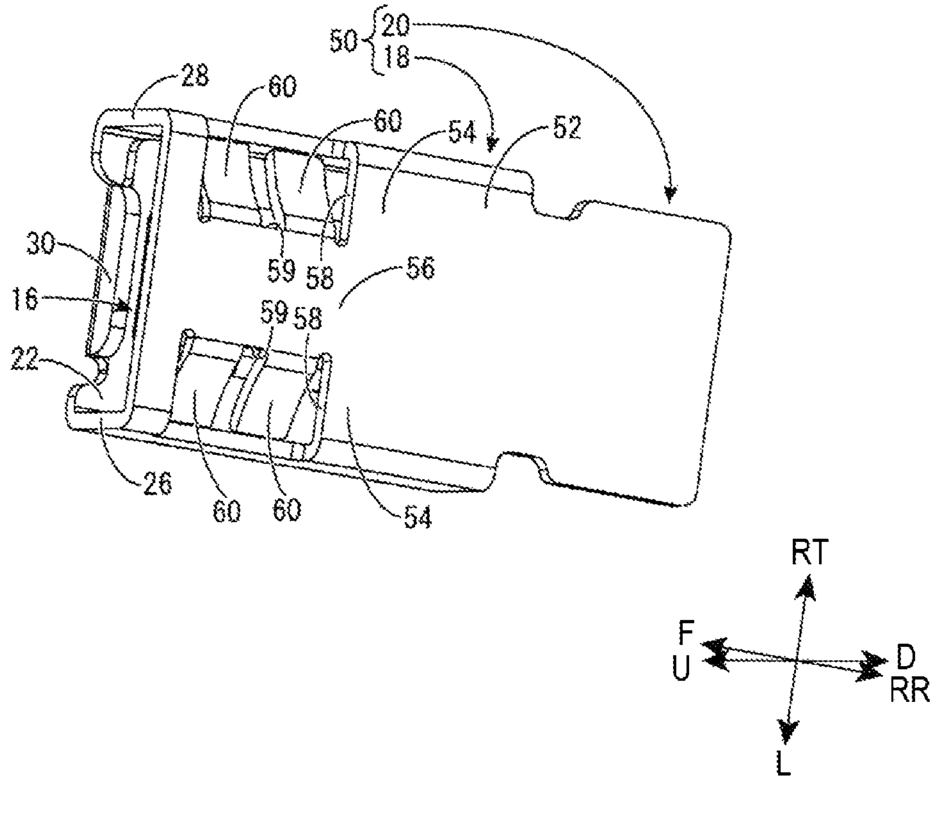
FIG. 8 is a perspective view of a female terminal shown in FIG. 6 when viewed from another direction.
Figure 9:
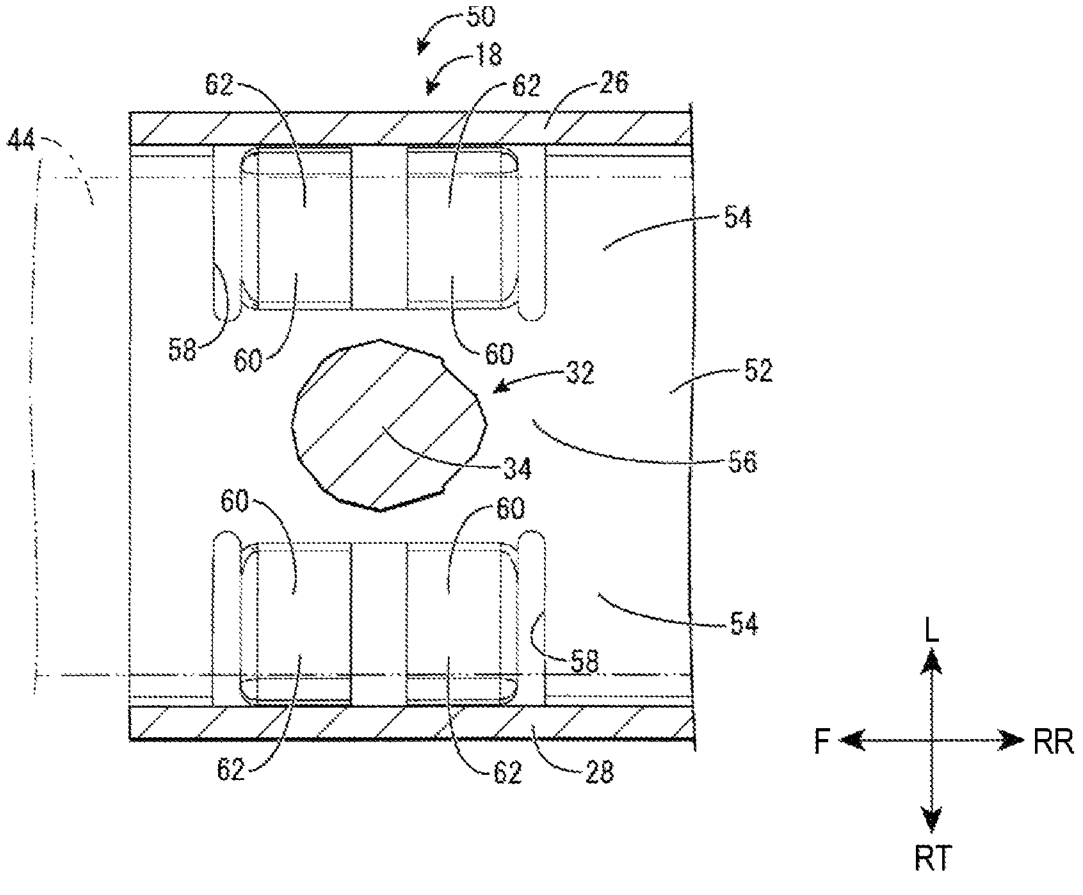
FIG. 9 is a section along IX-IX of FIG. 7 with a male terminal shown by a virtual line.

A second wall portion 52 of the female terminal 50 includes a pair of side edge parts 54, 54 respectively facing the pair of inclined portions 46, 46 of the male terminal 44 at the time of connecting the female terminal 50 and the male terminal 44, and an intermediate part 56 located between the pair of side edge parts 54, 54 in the plate width direction, which is the first direction (see FIG. 7). As shown in FIG. 8, window portions 58 penetrating in the plate thickness direction and having a rectangular cross-sectional shape are provided on front sides of the respective side edge parts 54, 54. Two second resilient contact portions 60 in the form of leaf springs having base end parts coupled to an end surface 59 of the intermediate part 56 facing the window portion 58 and cantilevered obliquely upward toward the window portion 58 are provided in the window portion 58. Further, in each side edge part 54, the two second resilient contact portions 60 are respectively arranged at two positions separated on both sides of the first contact point portion 34 in a front-rear direction, which is the inserting direction of the male terminal 44 (see FIG. 9). Note that the male terminal 44 is shown by a virtual line in FIG. 9. Each second resilient contact portion 60 is so inclined that a tip side is closer to a first wall portion 22 than the base end part, and a second contact point portion 62 is provided on the tip side of each second resilient contact portion 60 (see FIG. 7). As a result, two second contact point portions 62 provided on the two second resilient contact portions 60 contact each inclined portion 46 at two positions separated on the both sides of the first contact point portion 34 in the inserting direction.

According to such a terminal unit 42 of the second embodiment, the pair of inclined portions 46, 46 bent and inclined toward the one side (upper side) in the plate thickness direction are formed on the both sides in the plate width direction of the male terminal 44. The two second contact point portions 62 provided on the two second resilient contact portions 60 of the female terminal 50 contact each inclined portion 46 at two positions separated on the both sides of the first contact point portion 34 in the inserting direction. Further, the first contact point portion 34 of the first resilient contact portion 32 of the female terminal 50 contacts the flat portion 48 of the male terminal 44. In this way, even if the male terminal 44 is displaced in vertically opposite directions on both sides in the inserting direction with the first contact point portion 34 of the female terminal 50 as a center of rotation, a contact state of the second contact point portions 62 of the female terminal 50 with each inclined portion 46 of the male terminal 44 can be suitably maintained. Thus, it is possible to suppress troubles such as the separation of the inclined portions 46 of the male terminal 44 from the second contact point portions 62 of the female terminal 50 and the plating wear. Moreover, the male terminal 44 inserted into a male terminal insertion gap 16 is pressed toward the second wall portion 52 by the first resilient contact portion 32 of the female terminal 50. A component force (F3) acting inward in the plate width direction is generated by a reaction force (F1) generated by the inclined portion 46 of the male terminal 44 being pressed by the second contact point portions 62 of the female terminal 50. In this way, forces for hindering displacements of the male terminal 44 against an external force acting in the plate width direction of the male terminal 44 can be increased. Thus, a displacement of the male terminal 44 in the plate width direction with respect to the female terminal 50 can also be suppressed, wherefore fine sliding friction between the female terminal 50 and the male terminal 44 due to vibration or the like and an increase of a contact resistance value associated therewith can also be suppressed.

Further, the second resilient contact portions 60 in the form of leaf springs cantilevered from the intermediate part 56 can be easily formed in the pair of side edge parts 54, 54 of the female terminal 50 by press punching or the like. Furthermore, the second resilient contact portions 60 are respectively arranged at two positions separated on the both sides of the first contact point portion 34 in the inserting direction (front-rear direction) of the male terminal 44 in each side edge part 54, and the second contact point portion 62 is provided on the tip side of each second resilient contact portion 60. Therefore, displacements of the male terminal 44 in the vertically opposite directions on the both sides in the inserting direction with the first contact point portion 34 as a center of rotation can be both stably absorbed by the resilient deformation of the second resilient contact portions 60. In this way, it is possible to suppress troubles such as the separation of the inclined portions 46 of the male terminal 44 from the second contact point portions 62 of the female terminal 50 and the plating wear.

In addition, each second resilient contact portion 60 is so inclined that the tip side is closer to the first wall portion 22 than the base end part. In this way, reaction forces (F1) in directions perpendicular to the second contact point portions 62, which are reaction forces from the second contact point portions 62 of the female terminal 50 respectively in contact with the pair of inclined portions 46, 46 of the male terminal 44, can be caused to act inward in the plate width direction on both sides in the plate width direction of the male terminal 44. Since forces for hindering displacements of the male terminal 44 can be increased by advantageously utilizing the reaction forces from the second contact point portions 62 in this way, an effect of suppressing a displacement of the male terminal 44 in the plate width direction with respect to the female terminal 50 can also be improved.

Further, one first contact point portion 34 of the female terminal 50 is pressed against the flat portion 48 of the male terminal 44 from the one side (upper side) and four second contact point portions 62 of the female terminal 50 are pressed against the pair of inclined portions 46, 46 of the male terminal 44 from the other side (lower side). Since the male terminal 44 can be stably held by a total of five contact point portions 34, 62 of the female terminal 50 in this way, contact resistance can be reduced.

The female terminal 50 and the male terminal 44 of the present disclosure structured as just described can similarly have functions and effects enjoyable by the aforementioned terminal unit 42. Therefore, it is possible to suppress the separation of the male terminal 44 from the first contact point portion 34 and the second contact point portions 62, which are contact points of the female terminal 50, and the plating wear at the time of connecting the female terminal 50 and the male terminal 44.

Modifications

Although the first and second embodiments have been described in detail as specific examples of the present disclosure above, the present disclosure is not limited by this specific description. The present disclosure includes modifications, improvements and the like within a range in which the aim of the present disclosure can be accomplished. For example, the following modifications of the embodiments are also included in the technical scope of the present disclosure.

(1) Although there is only one first contact point portion 34 of the female terminal 14, 50 for the upper surface of the male terminal 12, 44 in the above embodiments, there is no limitation to this. A plurality of first contact point portions 34 may be provided. The first contact point portions 34 may contact the inclined portions 46.

(2) Although the second contact point portions 40 of the female terminal 14 are provided at two positions separated on the both sides of the first contact point portion 34 in the inserting direction of the male terminal 12 in the above first embodiment, there is no limitation to this. That is, the second contact point portions 40 of the female terminal 14 only have to be provided at a plurality of positions separated on the both sides of the first contact point portion 34 in the inserting direction of the male terminal 12 and only have to be provided at one or more positions on each side. The numbers of the second contact point portions 40 provided on one side and the other side in the inserting direction of the male terminal 12 may be different from each other. Further, although the second contact point portions 62 of the female terminal 50 are provided at two positions separated on the both sides of the first contact point portion 34 in the inserting direction of the male terminal 44 in each side edge part 54 of the female terminal 50 in the above second embodiment, there is no limitation to this. The second contact point portions 62 may take any form as long as being provided at a plurality of positions separated on the both sides of the first contact point portion 34 in the inserting direction of the male terminal 44 in each side edge part 54.

(3) Although the male terminal 44 includes the flat portion 48 between the pair of inclined portions 46, 46 in the above second embodiment, the flat portion 48 is not essential and the inclined portions 46 may be coupled in a widthwise center of the male terminal 44.

(4) Although the first resilient contact portion 32 in the form of a tongue piece is provided to extend from the first wall portion 22 in the above embodiments, there is no limitation to this. The first resilient contact portion only has to be provided on the first wall portion 22, project toward the second wall portion 24, 52, be resiliently deformable in the direction separating from the second wall portion 24, 52 and bias the male terminal 12, 44 toward the second wall portion 24, 52. For example, the first resilient contact portion may be constituted by a coil spring, a leaf spring or the like held on the first wall portion 22.

LIST OF REFERENCE NUMERALS

10 terminal unit (first embodiment)
12 male terminal
14 female terminal
16 male terminal insertion gap
18 body portion
20 wire connecting portion
22 first wall portion
24 second wall portion
26 side wall
28 side wall
30 protection wall
32 first resilient contact portion
34 first contact point portion
36 second resilient contact portion
38 window portion
40 second contact point portion
42 terminal unit (second embodiment)
44 male terminal
46 inclined portion
48 flat portion
50 female terminal
52 second wall portion
54 side edge part
56 intermediate part
58 window portion
59 end surface
60 second resilient contact portion
62 second contact point portion

What is claimed is:

1. A terminal unit, comprising:

a plate-like male terminal; and a female terminal to be connected to the male terminal, the female terminal including a first wall portion and a second wall portion arranged to face each other across a male terminal insertion gap, the male terminal being inserted into and arranged in the male terminal insertion gap, the first wall portion including a first resilient contact portion facing a surface on one side in a plate thickness direction of the male terminal, projecting toward the second wall portion and resiliently deformable in a direction separating from the second wall portion and a first contact point portion provided on the first resilient contact portion and to be brought into contact with the surface on the one side of the male terminal, the first resilient contact portion biasing the male terminal toward the second wall portion, the second wall portion including a plurality of second resilient contact portions facing a surface on the other side in the plate thickness direction of the male terminal, projecting toward the first wall portion and resiliently deformable in a direction separating from the first wall portion and a plurality of second contact point portions respectively provided on the plurality of second resilient contact portions and to be brought into contact with the surface on the other side of the male terminal, wherein at least two of the plurality of second resilient contact portions each extends from the second wall portion proximate a corresponding side wall edge part toward a center region of the male terminal insertion gap, the respective second resilient contact portions biasing the male terminal toward the first wall portion, and the plurality of second contact point portions being arranged at a plurality of positions separated on both sides of the first contact point portion in an inserting direction of the male terminal into the male terminal insertion gap.

2. The terminal unit of claim 1, wherein:

the male terminal includes a pair of inclined portions inclined toward the one side in the plate thickness direction of the male terminal on both sides in a first direction intersecting the inserting direction, and the plurality of second contact point portions provided on the plurality of second resilient contact portions contact the respective inclined portions at a plurality of positions separated on the both sides of the first contact point portion in the inserting direction.

3. The terminal unit of claim 2, wherein:

the second wall portion of the female terminal includes a pair of side edge parts respectively facing the pair of inclined portions of the male terminal and an intermediate part located between the pair of side edge parts in the first direction, each side edge part includes a window portion penetrating in the plate thickness direction and two second resilient contact portions in the form of leaf springs having base end parts coupled to an end surface of the intermediate part facing the window portion and cantilevered toward the window portion, and the two second resilient contact portions of each side edge part are respectively arranged at two positions separated on the both sides of the first contact point portion in the inserting direction, each second resilient contact portion is so inclined that a tip side is closer to the first wall portion than the base end part, and the second contact point portion is provided on the tip side of each second resilient contact portion.

4. The terminal unit of claim 2, wherein:

the male terminal includes a flat portion arranged between the pair of inclined portions in a plate width direction, and the first contact point portion of the first resilient contact portion of the female terminal contacts the flat portion of the male terminal.

5. The terminal unit of claim 2, wherein the second wall portion of the female terminal includes a pair of side edge parts respectively facing the pair of inclined portions of the male terminal and an intermediate part located between the pair of side edge parts.

6. The terminal unit of claim 2, wherein the second wall portion of the female terminal includes a pair of side edge parts, and each of the side edge parts includes a window portion penetrating in a plate thickness direction, and two second resilient contact portions in the form of leaf springs are cantilevered toward the window portion with base ends coupled to an end surface of an intermediate part.

7. The terminal unit of claim 2, wherein the at least of the plurality of second resilient contact portions are respectively arranged at two positions separated on both sides of the first contact point portion in an inserting direction of the male terminal.

8. The terminal unit of claim 2, wherein each of the at least of the plurality of second resilient contact portions is inclined such that a tip side is closer to the first wall portion than a base end part, and a second contact point portion is provided on the tip side.

9. A female terminal to be connected to a plate-like male terminal, the female terminal comprising:

a first wall portion and a second wall portion arranged to face each other across a male terminal insertion gap, the male terminal being inserted into and arranged in the male terminal insertion gap, the first wall portion including a first resilient contact portion facing a surface on one side in a plate thickness direction of the male terminal, projecting toward the second wall portion and resiliently deformable in a direction separating from the second wall portion and a first contact point portion provided on the first resilient contact portion and to be brought into contact with the surface on the one side of the male terminal, the first resilient contact portion biasing the male terminal toward the second wall portion, the second wall portion including a plurality of second resilient contact portions facing a surface on the other side in the plate thickness direction of the male terminal, projecting toward the first wall portion and resiliently deformable in a direction separating from the first wall portion and a plurality of second contact point portions respectively provided on the plurality of second resilient contact portions and to be brought into contact with the surface on the other side of the male terminal, wherein at least two of the plurality of second resilient contact portions each extends from the second wall portion proximate a corresponding side wall edge part toward a center region of the male terminal insertion gap, the respective second resilient contact portions biasing the male terminal toward the first wall portion, and the plurality of second contact point portions being arranged at a plurality of positions separated on both sides of the first contact point portion in an inserting direction of the male terminal into the male terminal insertion gap.

10. A terminal unit, comprising:

a plate-like male terminal; and a female terminal to be connected to the male terminal, the female terminal including a first wall portion and a second wall portion arranged to face each other across a male terminal insertion gap, the male terminal being inserted into and arranged in the male terminal insertion gap, the first wall portion including a first resilient contact portion facing a surface on one side in a plate thickness direction of the male terminal, projecting toward the second wall portion and resiliently deformable in a direction separating from the second wall portion and a first contact point portion provided on the first resilient contact portion and to be brought into contact with the surface on the one side of the male terminal, the first resilient contact portion biasing the male terminal toward the second wall portion, the second wall portion including a plurality of second resilient contact portions facing a surface on the other side in the plate thickness direction of the male terminal, projecting toward the first wall portion and resiliently deformable in a direction separating from the first wall portion and a plurality of second contact point portions respectively provided on the plurality of second resilient contact portions and to be brought into contact with the surface on the other side of the male terminal, wherein at least two of the plurality of second resilient contact portions each extends from the second wall portion toward a corresponding side wall edge part, the respective second resilient contact portions biasing the male terminal toward the first wall portion, and the plurality of second contact point portions being arranged at a plurality of positions separated on both sides of the first contact point portion in an inserting direction of the male terminal into the male terminal insertion gap.

11. The terminal unit of claim 10, wherein:

the male terminal includes a pair of inclined portions inclined toward the one side in the plate thickness direction of the male terminal on both sides in a first direction intersecting the inserting direction, and the plurality of second contact point portions provided on the plurality of second resilient contact portions contact the respective inclined portions at a plurality of positions separated on the both sides of the first contact point portion in the inserting direction.

12. The terminal unit of claim 11, wherein:

the second wall portion of the female terminal includes a pair of side edge parts respectively facing the pair of inclined portions of the male terminal and an intermediate part located between the pair of side edge parts in the first direction, each side edge part includes a window portion penetrating in the plate thickness direction and two second resilient contact portions in the form of leaf springs having base end parts coupled to an end surface of the intermediate part facing the window portion and cantilevered toward the window portion, and the two second resilient contact portions of each side edge part are respectively arranged at two positions separated on the both sides of the first contact point portion in the inserting direction, each second resilient contact portion is so inclined that a tip side is closer to the first wall portion than the base end part, and the second contact point portion is provided on the tip side of each second resilient contact portion.

13. The terminal unit of claim 11, wherein:

the male terminal includes a flat portion arranged between the pair of inclined portions in a plate width direction, and the first contact point portion of the first resilient contact portion of the female terminal contacts the flat portion of the male terminal.

14. The terminal unit of claim 11, wherein the second wall portion of the female terminal includes a pair of side edge parts respectively facing the pair of inclined portions of the male terminal and an intermediate part located between the pair of side edge parts.

15. The terminal unit of claim 11, wherein the second wall portion of the female terminal includes a pair of side edge parts, and each of the side edge parts includes a window portion penetrating in a plate thickness direction, and two second resilient contact portions in the form of leaf springs are cantilevered toward the window portion with base ends coupled to an end surface of an intermediate part.

16. The terminal unit of claim 11, wherein the at least of the plurality of second resilient contact portions are respectively arranged at two positions separated on both sides of the first contact point portion in an inserting direction of the male terminal.

17. The terminal unit of claim 11, wherein each of the at least of the plurality of second resilient contact portions is inclined such that a tip side is closer to the first wall portion than a base end part, and a second contact point portion is provided on the tip side.

* * * * *